United States Patent [19]

Menezes et al.

[11] Patent Number: 5,682,223
[45] Date of Patent: Oct. 28, 1997

[54] MULTIFOCAL LENS DESIGNS WITH INTERMEDIATE OPTICAL POWERS

[75] Inventors: Edgar V. Menezes; Jeffrey H. Roffman, both of Jacksonville, Fla.

[73] Assignee: Johnson & Johnson Vision Products, Inc., Jacksonville, Fla.

[21] Appl. No.: 433,737

[22] Filed: May 4, 1995

[51] Int. Cl.⁶ ................................ G02C 7/04; A61F 2/16
[52] U.S. Cl. ...................... 351/161; 351/160 H; 623/6
[58] Field of Search ............................ 351/161, 168, 351/160 R, 160 H; 623/6

[56] References Cited

U.S. PATENT DOCUMENTS

| | | | |
|---|---|---|---|
| 4,704,016 | 11/1987 | deCarle | 351/161 |
| 4,890,912 | 1/1990 | Visser | 351/161 |
| 4,890,913 | 1/1990 | deCarle | 351/161 |
| 4,923,296 | 5/1990 | Erickson | 351/161 |
| 5,002,382 | 3/1991 | Seidner | 351/161 |
| 5,024,517 | 6/1991 | Seidner | 351/161 |
| 5,106,180 | 4/1992 | Marie et al. | 351/161 |
| 5,112,351 | 5/1992 | Christie et al. | 623/6 |
| 5,158,572 | 10/1992 | Nielson | 623/6 |
| 5,166,712 | 11/1992 | Portney | 351/161 |

Primary Examiner—Georgia Y. Epps
Assistant Examiner—Jordan M. Schwartz

[57] ABSTRACT

A multifocus, concentric annular ring lens wherein one of the front and back surfaces of the lens defines a central area comprising a circular disc having a spherical surface corresponding to a basic prescription Rx spherical distance optical power. A plurality of annular rings surround the central area and have alternating spherical near and distance optical powers, and at least one intermediate optical power annular ring. The immediate optical power annular ring is located in the middle or outer region of the lens optic zone, and its optical power is intermediate to the distance and near optical powers, to provide visual acuity at intermediate distances. The intermediate optical power annular ring can be placed anywhere in the middle or outer region of the lens optic zone, and can be the second annular ring from the outer edge of the lens optic zone, or can be the outermost annular ring which defines the outer circumference of the lens optic zone. The lens can be a contact lens to be worn on the cornea of the eye, such as a soft hydrogel contact lens, or can be an intraocular lens.

8 Claims, 1 Drawing Sheet

MULTIFOCAL LENS DESIGNS WITH INTERMEDIATE OPTICAL POWERS

BACKGROUND OF THE INVENTION

1. Field of the Invention

The present invention relates generally to multifocal lens designs with intermediate optical powers, and more particularly pertains to multifocal lens designs with intermediate optical powers which provide for visual acuity at intermediate distances by adding one or more intermediate optical power annular rings to a multifocal concentric annular ring lens.

2. Discussion of the Prior Art

The present invention pertains to ophthalmic lenses, and in particular to contact lenses such as soft hydrogel contact lenses, and intraocular lenses, having more than one optical power or focal length.

It is well known that as an individual ages, the eye is less able to accommodate, i.e., bend the natural lens in the eye in order to focus on objects that are relatively near to the observer. This condition is referred to as presbyopia, and presbyopes have in the past relied upon spectacles or other lenses having a number of different regions with different optical powers to which the wearer can shift his vision in order to find the appropriate optical power for the object or objects upon which the observer wishes to focus.

With spectacles the process involves shifting one's field of vision from typically an upper lens portion far power to a lower lens portion near power. With soft or hydrogel contact lenses, however, this approach has been less than satisfactory. The contact lens, working in conjunction with the natural lens, forms an image on the retina of the eye by focusing light incident on each part of the cornea from different field angles onto each part of the retina in order to form an image. This is demonstrated by the fact that as the pupil contracts in response to brighter light, the image on the retina does not shrink, but rather, light comes through a smaller area of the lens to form the entire image.

Similarly, for a person that has had the natural lens of the eye removed because of a cataract condition and an intraocular lens inserted as a replacement, the ability to adjust the lens (accommodate) to the distance of the object being viewed is totally absent. In this case, the lens provided is usually set at a single infinite distance focal power, and spectacles are worn to provide the additional positive optical power needed for in-focus closer vision. For such a patient, a functional multifocal lens would be particularly useful.

It is also known in the art that under certain circumstances the brain can discriminate between separate competing images by accepting an in-focus image and rejecting an out-of-focus image.

One example of this type of lens used for the correction of presbyopia by providing simultaneous near and far vision is described in U.S. Pat. No. 4,923,296 to Erickson. This patent discloses a lens system which comprises a pair of contact lenses, each having equal areas of near and distant optical power, with the lens for one eye having a near upper half and a distant lower half and the lens for the other eye having a distant upper half and near lower half. Together they provide at least partial clear images in both eyes, and through suppression by the brain of the blurred images, allow alignment of the clear images to produce an in-focus image.

U.S. Pat. No. 4,890,913 to de Carle describes a bifocal contact lens comprising a number of annular zones having different optical powers. The object in the design of this lens is to maintain, at all times regardless of pupil diameter, an approximately equal division between near and distant powers, which requires between six and twelve total zones on the lens.

Another attempt at providing a bifocal contact lens is described in U.S. Pat. No. 4,704,016 to de Carle. Again, this lens attempts to maintain, at all times regardless of pupil diameter, an approximately equal division between near and distant powers.

U.S. Pat. No. 5,448,312 entitled PUPIL TUNED MULTIFOCAL OPHTHALMIC LENS, discloses a multifocal concentric ophthalmic lens for presbyopic patients constructed with three general annular lens portions in a multifocal design. A central circular portion of the lens has only the patient's distance corrective power, and is surrounded by a first inner annular portion, which can consist of multiple annular rings having an inner radial portion which enhances the patient's near focal power encircled by radial portions of substantially equal cumulative amounts of distance and near optical power focal correction for the patient. This is surrounded by a second outer annular portion, which can also consist on one or more annular rings having additional distance focal power near the periphery of the optical surface area of the ophthalmic lens. Each annular ring has either a near or distance optical power and works in combination with other lens portions to yield the desired focal ratio in that portion of the lens.

Trifocal spectacles are also well known in the prior art in which an upper spectacle lens portion has a prescription for far vision, a lower spectacle lens portion has a prescription for near vision, and an intermediate spectacle lens portion, positioned between the upper and lower lens portions, has a prescription for intermediate vision. Moreover, blended trifocal and multifocal spectacles are also known in which an upper lens portion has a prescription for far vision, and a lower lens portion has a prescription for near vision, and an intermediate lens portion has a blended prescription which changes gradually from the optical power for the upper portion to the optical power for the lower lens portion.

However, these concepts are not readily extendible to contact or intraocular lenses, as a wearer cannot shift his vision through different upper and lower areas of a contact or intraocular lens. The only change that the eye makes with respect to a contact or intraocular lens is an involuntary control over the diameter of the pupil, which decreases in bright light and increases in dim light.

SUMMARY OF THE INVENTION

It is an object, therefore, of the present invention to provide an ophthalmic lens for a presbyope that yields improved visual acuity in general, and in particular, matches the focal requirements of intermediate distance conditions.

The present invention provides a contact or intraocular lens which matches the distribution of near, intermediate and distance focal vision corrections to the type of human activity typically undertaken in various illumination conditions. The present invention also matches the particular dimensions of a contact lens to suit the size of the pupil of the wearer as a function of illumination intensity. The ophthalmic lens is designed to provide predominantly distance correction under high illumination, nearly evenly divided distance and near corrections under moderate illumination, and provide intermediate vision correction under low to moderate illumination levels. The lens is also specifically designed to match the wearer's pupil size as a function of illumination level, and in preferred embodiments by also applying pupil size parameters as a function of the age of the wearer.

Accordingly, it is a primary object of the present invention to provide multifocal lens designs with intermediate powers which address the problem of intermediate optical distance vision by adding one or more intermediate optical power annular rings to a multifocal concentric annular ring lens.

A preferred intermediate optical power is substantially 50% of the add difference between the distance power and the near power, but could be chosen to be any optical power between the distance and near optical powers.

In accordance with the teachings herein, the present invention provides a multifocus, concentric annular ring lens wherein one of the front and rear surfaces of the lens defines a central area comprising a circular disc having a spherical surface corresponding to a basic prescription spherical distance optical power. A plurality of annular rings surround the central area and have alternating spherical near optical powers and spherical distance optical powers, and at least one intermediate optical power annular ring. The intermediate optical power annular ring may be located in the outer region of the lens optic zone, and its optical power is intermediate to the distance and near optical powers, to provide visual acuity at intermediate distances.

In greater detail, the intermediate optical power annular ring or rings can be placed in the outer radial portion of the optic zone, where it can be an annular ring in that portion, or it may consist of the entire outer radial portion, or it can be placed in the middle radial portion, where it is preferably placed in the outer edge thereof, or it may be placed anywhere in that portion. The lens can be a contact lens to be worn on the cornea of the eye, such as a soft hydrogel contact lens, or can be an intraocular lens. The central area and the plurality of annular rings are preferably formed on the back surface of a contact lens to minimize flare and glare problems. Moreover, the widths of the individual annular rings can be different to generate a power profile which varies to generate different ratios of distance optical power to intermediate and near optical power.

BRIEF DESCRIPTION OF THE DRAWINGS

The foregoing objects and advantages of the present invention for multifocal lens designs with intermediate optical powers may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
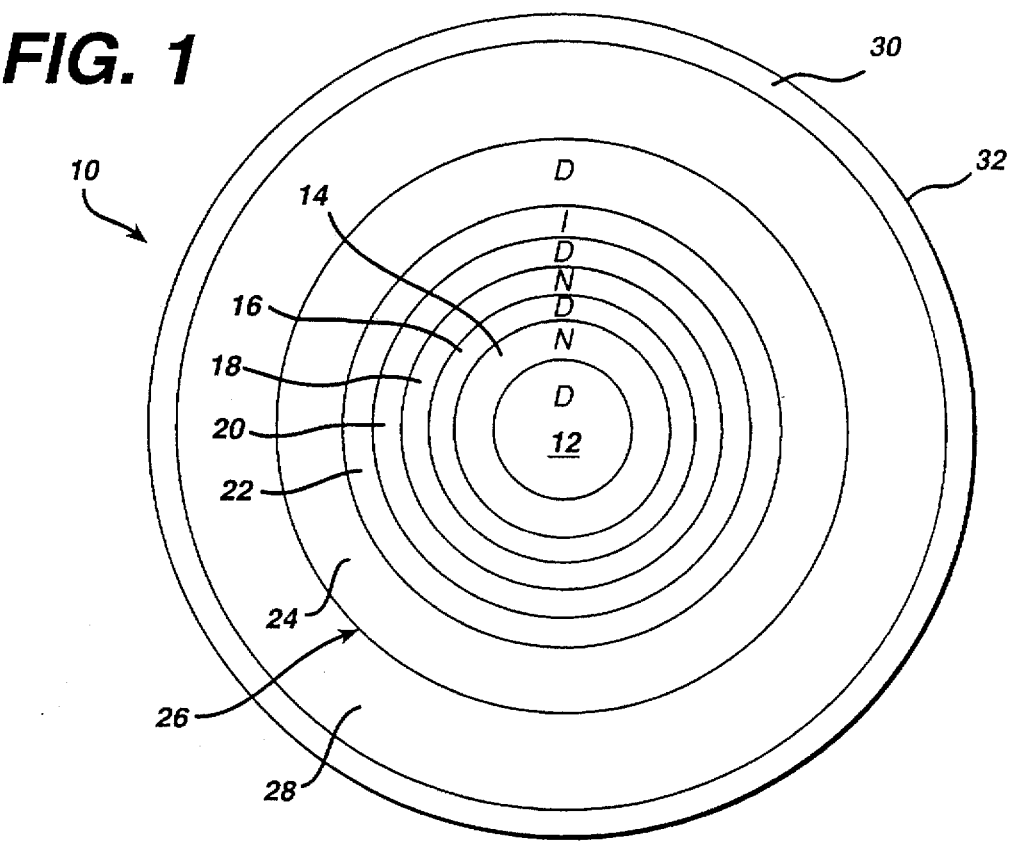
FIG. 1 is a plan view of a first embodiment of a multifocal lens design having an intermediate optical power wherein an intermediate optical power annular ring is the outermost annular ring in the middle portion of the optical zone of the lens.

Referring to the drawings in detail, FIG. 1 illustrates a preferred type of embodiment of a lens 10 designed pursuant to the teachings of the present invention wherein a central area 12 is a circular disc containing the basic prescribed Rx spherical distance power, and is surrounded by a plurality of alternating spherical near power and spherical distance power annular rings 14, 16, 18 and 20. In the first embodiment of FIG. 1, an intermediate optical power annular ring 22, having an optical power intermediate to the distance and near optical powers, is added as the second outermost annular ring. The intermediate optical power annular ring 22 is encompassed by an outermost distance optical power annular ring 24.

A preferred intermediate optical power is 50% of the difference between the distance and near optical powers, but could be chosen to be any optical power between the distance and near optical powers. A preferred position for the intermediate optical power annular ring is in the outer region of the lens optic zone 26, preferably the second outermost annular ring 22 from the outer edge of the lens optic zone 26. The totality of the area encompassed by the outer circumference of the outermost ring 24 defines the optic zone 26 of the lens 10, which includes the areas of 12, 14, 16, 18, 20, 22 and 24. The optic zone 26 is surrounded by a peripheral zone 28, which is a nonoptical area of the lens, which is beveled at 30 to the outer circumference 32 of the lens.

In greater detail, in one exemplary designed embodiment, the center disc 12 and the annular rings 16, 20 and 24 have a distance radius of 8.4 mm, while annular rings 14 and 18 have a near radius of 8.69443 mm, annular ring 22 has an intermediate curve radius of 8.3803 mm, and the peripheral curve radius is 9.832 mm.

The center toric disc 12 has a diameter of 2.15 mm, annular ring 14 has a diameter of 3.30 mm, annular ring 16 has a diameter of 3.60 mm, annular ring 18 has a diameter of 4.30 mm, annular ring 20 has a diameter of 4.80 mm, annular ring 22 has a diameter of 5.35 mm, annular ring 24 has a diameter of 8.00 mm, the lenticular annular area 28 has a diameter of 13.0 mm to the start of beveled area 30, and the outer circumference of the lens has a diameter of 14.0 mm.

Figure 2:
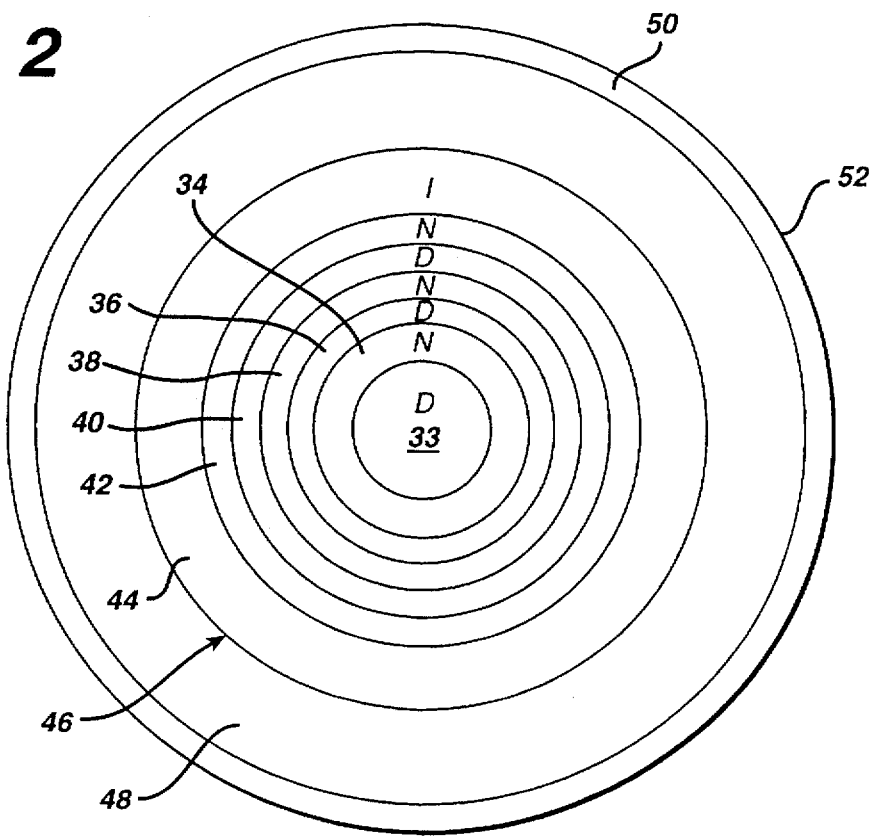
FIG. 2 is a plan view of a second embodiment of a multifocal lens design having an intermediate optical power wherein an intermediate optical power annular ring is the outermost annular ring in the optical zone of the lens.

FIG. 2 is a plan view of a second embodiment of a multifocal lens design having an intermediate optical power wherein the intermediate optical power annular ring 44 is the outermost annular ring 44 in the optical zone 46 of the lens. Similar to the first embodiment, a central area 33 is a circular disc containing the basic prescribed spherical distance power, and is surrounded by a plurality of alternating spherical near power and spherical distance power annular rings 34, 36, 38, 40 and 42. The intermediate optical power annular ring is the outermost annular ring 44 within the lens optic zone 46. The combined areas of the central spherical disk 33 and the surrounding annular rings 34 through 44 comprise the active optical area 46 of the lens, which is surrounded by a peripheral (nonoptical) area 48 which is beveled at its outer circumference at 50 to an outer circumferential edge 52.

The area of the intermediate power portion preferably should not exceed 25% of the total area of the full optic zone. It should be noted that the intermediate power is distinct and different from the intermediate peripheral curve and is preferably a sphere.

By varying the widths of the individual annular rings, a power profile can be created which generates different ratios of distance optical power to near and intermediate optical powers with increasing distance from the center of the lens.

A person's pupil size is a function which is dependent upon light intensity, and is an important parameter in the design of ophthalmic lenses, particularly contact lenses and intraocular lenses.

Reliable data was obtained from people in four different age groups. Those less than 20 years of age, those between 20 and 40 years of age, those between 40 and 60 years of age, and those over 60 years of age. These pupil measurements were made on test subjects at three different luminance levels, 250, 50 and 2.5 candellas per square meter ($cd/m^2$).

The 250 $cd/m^2$ level corresponds to extremely bright illumination typically outdoors in bright sunlight. The 50 $cd/m^2$ is a mixed level which is found in both indoors and outdoors. Finally, the 2.5 $cd/m^2$ level is most typically found outdoors at night, usually in an uneven illumination situation such as night driving.

The results of these studies are given in the following Table I, which includes in addition to the average pupil diameter at three different illumination levels, the standard deviation in the diameter and the range associated therewith.

TABLE I

| Illumination (candellas/$m^2$) | Average Pupil Diameter (mm) | Standard Deviation (1Σ) |
|---|---|---|
| LESS THAN 20 YEARS OF AGE | | |
| 2.5 | 6.5962 | 0.9450 |
| 50 | 4.3499 | 0.5504 |
| 250 | 3.4414 | 0.3159 |
| 20 to 40 YEARS OF AGE | | |
| 2.5 | 6.4486 | 0.8259 |
| 50 | 4.4843 | 0.6342 |
| 250 | 3.5040 | 0.4217 |
| 40 to 60 YEARS OF AGE | | |
| 2.5 | 5.4481 | 0.9787 |
| 50 | 3.6512 | 0.5692 |
| 250 | 3.0368 | 0.4304 |
| GREATER THAN 60 YEARS OF AGE | | |
| 2.5 | 4.7724 | 0.6675 |
| 50 | 3.4501 | 0.5106 |
| 250 | 2.8260 | 0.3435 |

Taken in combination with this data are the determinations that have been made regarding real world human activity typically encountered under different illumination levels. At very high illumination levels, such as that represented by 250 $cd/m^2$, human activity is typically taking place outdoors in bright sunlight and requires distant vision tasks.

At a 50 $cd/m^2$ illumination level, activity usually occurs both indoors and out, and typical human activity is represented by both near and far visual tasks.

Finally, at low illumination levels represented by the 2.5 $cm/m^2$, the activity that takes place is typically outdoors at night and usually involves distant vision tasks, such as driving an automobile.

The corrective powers as a function of the distance from the center of the lens must be a function of the patient's specifically measured pupil diameter at varying illumination levels, or it can be readily determined from the above information based upon the age of the patient.

Moreover, ocular in vivo image quality measurement devices can be used to optimize the ocular image quality in the concentric annular ring designs to produce even more improved designs. This is accomplished by using an in vivo image quality measurement device, such as an aberroscope or MTF point spread measuring device, to measure and decrease the sum of the aberrations of the combination of the lens and the eye system.

Obviously, many different embodiments of the present invention are possible, with alterations of the number of annular rings, the widths and arrangement of the annular rings, and the optical powers assigned to each of the annular rings.

While several embodiments and variations of the present invention for multifocal lens designs with intermediate powers are described in detail herein, it should be apparent that the disclosure and teachings of the present invention will suggest many alternative designs to those skilled in the art.

What is claimed is:

1. A multifocus, concentric annular ring lens, comprising:
   a. said lens having a front surface and an opposite back surface, wherein one of the front and back surfaces defines a central area comprising a circular disc having a spherical surface corresponding to a basic prescriptive spherical distance optical power;
   b. a plurality of annular rings surrounding the central area and having alternating spherical near optical powers and spherical distance optical powers;
   c. at least one intermediate optical power annular ring, located in the outer region of the lens optic zone, having an intermediate optical power, intermediate to the distance optical power and the near optical power, to provide visual acuity at intermediate distances; and
   d. the widths of individual annular rings are different to generate a power profile which varies to generate different ratios of distance optical power to intermediate and near optical power with increasing distance from the center of the lens.

2. A multifocus, concentric annular ring lens as claimed in claim 1, wherein the intermediate optical power annular ring is the second annular ring from the outer edge of the lens optic zone.

3. A multifocus, concentric annular ring lens as claimed in claim 1, wherein the intermediate optical power annular ring is the outermost annular ring which defines the outer circumference of the lens optic zone.

4. A multifocus, concentric annular ring lens as claimed in claim 1, wherein the lens comprises a contact lens to be worn on the cornea of the eye.

5. A multifocus, concentric annular ring lens as claimed in claim 4, wherein the contact lens comprises a soft hydrogel contact lens.

6. A multifocus, concentric annular ring lens as claimed in claim 1, wherein the lens comprises an intraocular lens.

7. A multifocus, concentric annular ring lens as claimed in claim 1, wherein the central area and the plurality of annular rings are formed on the rear surface of the lens to minimize flare and glare problems.

8. A multifocus, concentric annular ring lens as claimed in claim 1, wherein the ratio of distance optical power to intermediate and near optical power increases with increasing distance from the center of the lens.

* * * * *